US010563395B2

(12) United States Patent
Liingaard et al.

(10) Patent No.: US 10,563,395 B2
(45) Date of Patent: Feb. 18, 2020

(54) REINFORCEMENT TOOL FOR REAR FRAME STRUCTURE OF A WIND TURBINE NACELLE

(71) Applicant: Vestas Wind Systems A/S, Aarhus N. (DK)

(72) Inventors: Anders Haslund Liingaard, Hinnerup (DK); Kristoffer Isbak Thomsen, Århus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/304,449

(22) PCT Filed: Mar. 9, 2017

(86) PCT No.: PCT/DK2017/050066
§ 371 (c)(1),
(2) Date: Nov. 26, 2018

(87) PCT Pub. No.: WO2017/220093
PCT Pub. Date: Dec. 28, 2017

(65) Prior Publication Data
US 2019/0136511 A1 May 9, 2019

(30) Foreign Application Priority Data
Jun. 22, 2016 (DK) .................. 2016 70451

(51) Int. Cl.
*E04B 1/41* (2006.01)
*F03D 80/80* (2016.01)
(Continued)

(52) U.S. Cl.
CPC ............... *E04B 1/40* (2013.01); *B66C 1/108* (2013.01); *E04C 3/08* (2013.01); *F03D 13/20* (2016.05);
(Continued)

(58) Field of Classification Search
CPC ...... E04B 1/40; E04C 3/08; E04C 2003/0495; F03D 13/20; F03D 80/80; B66C 1/108; Y02E 10/726; Y02P 70/523
See application file for complete search history.

(56) References Cited

U.S. PATENT DOCUMENTS 8,333,209 B2 * 12/2012 Daas ........................ E04G 11/48
135/143
2006/0042181 A1 * 3/2006 Foo ..................... B63B 35/4413
52/633

(Continued)

FOREIGN PATENT DOCUMENTS

CN 2231702 Y 7/1996
CN 101622404 A 1/2010
(Continued)

OTHER PUBLICATIONS

Danish Patent and Trademark Office, Search Report in PA 2016 70451, dated Jan. 10, 2017.
(Continued)

*Primary Examiner* — Rodney Mintz
(74) *Attorney, Agent, or Firm* — Wood Herron & Evans LLP

(57) ABSTRACT

A detachable reinforcement tool (1) for providing temporary reinforcement of a rear frame structure (6) for a nacelle of a wind turbine is disclosed. The rear frame structure (6) comprises a plurality of truss members (4) and a plurality of joints (5), each joint (5) interconnecting ends of at least two truss members (4). The reinforcement tool (1) comprises a reinforcement part (2), and attaching means (3) for detachably attaching the reinforcement part (2) to two different parts (4, 5) of the rear frame structure (6). The reinforcement tool (1) is arranged to provide a load transferring connection between two parts (4, 5) of the rear frame structure (6) when the reinforcement part (2) is attached to the two parts (4, 5)

(Continued)

of the rear frame structure (6) by means of the attaching means (3). The rear frame structure (6) is capable of handling extreme loads without being designed to handle such loads permanently. Manufacturing costs and weight of the rear frame structure (6) are reduced.

13 Claims, 4 Drawing Sheets

(51) Int. Cl.
*B66C 1/10* (2006.01)
*F03D 13/20* (2016.01)
*E04C 3/08* (2006.01)
*E04C 3/04* (2006.01)

(52) U.S. Cl.
CPC ...... *F03D 80/80* (2016.05); *E04C 2003/0495* (2013.01); *Y02E 10/726* (2013.01); *Y02P 70/523* (2015.11)

(56) References Cited

U.S. PATENT DOCUMENTS

| | | | | |
|---|---|---|---|---|
| 2010/0071299 A1* | 3/2010 | Daas | ...................... | E04C 3/005 |
| | | | | 52/646 |
| 2010/0117368 A1 | 5/2010 | Benito et al. | | |
| 2011/0133475 A1* | 6/2011 | Zheng | ..................... | E04H 12/10 |
| | | | | 290/55 |
| 2011/0140447 A1 | 6/2011 | Paura et al. | | |
| 2011/0243726 A1 | 10/2011 | Wohlleb | | |
| 2011/0252743 A1* | 10/2011 | Yang | ..................... | E04B 1/2403 |
| | | | | 52/849 |
| 2012/0138559 A1* | 6/2012 | Huff | ......................... | E04C 3/10 |
| | | | | 212/175 |
| 2014/0083046 A1* | 3/2014 | Yang | ......................... | E04B 1/24 |
| | | | | 52/704 |
| 2014/0182234 A1* | 7/2014 | Yang | ......................... | E04B 1/24 |
| | | | | 52/655.1 |
| 2016/0160843 A1* | 6/2016 | Jensen | .................... | F03D 1/065 |
| | | | | 52/650.3 |
| 2017/0152838 A1* | 6/2017 | Thomsen | ................. | F03D 80/00 |
| 2019/0127969 A1* | 5/2019 | Petersen | ................. | F03D 13/20 |
| 2019/0177965 A1* | 6/2019 | De Almeida Borges | .................... | |
| | | | | E04B 1/40 |
| 2019/0194945 A1* | 6/2019 | Ghomi | ..................... | E04C 3/18 |

FOREIGN PATENT DOCUMENTS

| | | |
|---|---|---|
| CN | 104358242 A | 2/2015 |
| CN | 105089948 A | 11/2015 |
| EP | 1677007 A2 | 7/2006 |
| EP | 2317137 A1 | 5/2011 |
| EP | 2453081 A2 | 5/2012 |
| EP | 2505541 A1 | 10/2012 |
| EP | 2865891 A1 | 4/2015 |
| WO | 2010142304 A1 | 12/2010 |
| WO | 2011051272 A2 | 5/2011 |
| WO | 2015149808 A1 | 10/2015 |

OTHER PUBLICATIONS

European Patent Office, International Search Report and Written Opinion in PCT/DK2017/050066, dated Jun. 13, 2017.
China National Intellectual Property Administration, First Notification of Office Action in CN Application No. 201780031901.9, dated Nov. 29, 2019.

* cited by examiner

REINFORCEMENT TOOL FOR REAR FRAME STRUCTURE OF A WIND TURBINE NACELLE

FIELD OF THE INVENTION

The present invention relates to a reinforcement tool for providing temporary reinforcement of a rear frame structure for a nacelle of a wind turbine. The reinforcement tool of the invention ensures that extraordinary loads can be handled by the rear frame structure, while allowing the rear frame structure to be designed to handle smaller loads which may be expected during normal operation of the wind turbine.

BACKGROUND OF THE INVENTION

Wind turbines normally comprise a nacelle arranged on top of a tower structure. The nacelle carries a rotor with one or more wind turbine blades, and various components, such as gear arrangement, generator, etc., are normally housed inside the nacelle.

Nacelles often comprise a main frame, a rear frame structure and a nacelle cover. The main frame is a load-carrying structure arranged to be connected to the tower structure via a yaw mechanism, allowing the nacelle to perform rotating movements with respect to the tower structure in order to direct the wind turbine blades towards the incoming wind. The rear frame structure also exhibits load-carrying capabilities, e.g. for carrying some of the components being housed inside the nacelle, and is connected at one end to the main frame. The nacelle cover forms an outer boundary of the nacelle and provides protection against the environment for the components arranged inside the nacelle. The nacelle cover will often not exhibit load-carrying capabilities.

It may sometimes be desirable to apply loads to a rear frame structure of a nacelle which exceed what is expected during normal operation of the wind turbine. For instance, it may be desirable to operate a crane inside the nacelle, e.g. in order to hoist, lower or move heavy components, such as gear arrangement or generator, to, from or inside the nacelle. In order to ensure that the rear frame structure is capable of handling such loads, it is necessary to design the rear frame structure with sufficient strength, e.g. by selecting a material and/or a material thickness providing the desired strength. This may add to the manufacturing costs as well as to the weight of the nacelle. Furthermore, during normal operation of the wind turbine, the strength of the rear frame structure will be significantly above the required strength, i.e. the rear frame structure may be regarded as 'overdimensioned' with respect to strength.

DESCRIPTION OF THE INVENTION

It is an object of embodiments of the present invention to provide a reinforcement tool for a rear frame structure of a nacelle for a wind turbine, the reinforcement tool allowing the rear frame structure to temporarily handle loads beyond expected loads during normal operation of the wind turbine.

It is a further object of embodiments of the invention to provide a nacelle for a wind turbine, the nacelle being capable of handling peak loads exceeding expected loads during normal operation of the wind turbine, without increasing the manufacturing costs and the weight of the nacelle.

It is a further object of embodiments of the invention to provide a method for reinforcing a rear frame structure for a nacelle of a wind turbine.

The invention provides a detachable reinforcement tool for providing temporary reinforcement of a rear frame structure for a nacelle of a wind turbine, the rear frame structure comprising a plurality of truss members and a plurality of joints, each joint interconnecting ends of at least two truss members, the reinforcement tool comprising:
 a reinforcement part, and
 attaching means for detachably attaching the reinforcement part to two different parts of the rear frame structure,
wherein the reinforcement tool is arranged to provide a load transferring connection between two parts of the rear frame structure when the reinforcement part is attached to the two parts of the rear frame structure by means of the attaching means.

Thus, the invention provides a reinforcement tool, i.e. a tool which is capable of providing reinforcement of a selected part of a rear frame structure for a nacelle of a wind turbine. The reinforcement tool is detachable, and thereby provides temporary reinforcement of the rear frame structure, i.e. it provides reinforcement when mounted on the rear frame structure, and the reinforcement is removed when the reinforcement tool is detached from the rear frame structure. This will be described in further detail below.

As described above, in the present context the term 'rear frame structure' should be interpreted to mean a load-carrying structure of the nacelle, which is not directly connected to the tower structure of the wind turbine.

The rear frame structure comprises a plurality of truss members and a plurality of joints. In the present context the term 'truss member' should be interpreted to mean an elongated and relatively rigid member being suitable for forming part of a truss structure, and which is arranged to provide load-carrying capability to the rear frame structure. The truss members could, e.g., be in the form of rods, beams or the like.

The truss members of the rear frame structure are connected to each other via the joints. Thereby a truss structure may be formed with the joints arranged in node points of the truss structure, the node points being interconnected by truss members.

The reinforcement tool comprises a reinforcement part and attaching means for detachably attaching the reinforcement part to two different parts of the rear frame structure. Accordingly, when the reinforcement tool is mounted on the rear frame structure, one portion of the reinforcement part is attached to a first part of the rear frame structure, in the form of a truss member or a joint, and another portion of the reinforcement part is attached to a second part of the rear frame structure, in the form of another truss member or joint, by means of the attaching means. Thereby the first and second parts of the rear frame structure are interconnected by the reinforcement part, and the reinforcement tool accordingly provides a load transferring connection between the two interconnected parts of the rear frame structure, via the reinforcement part.

Thus, the reinforcement tool of the invention provides temporary reinforcement to a selected portion of the rear frame structure, if and when such reinforcement is required. However, when such reinforcement is not required, the reinforcement tool can be detached from the rear frame structure, thereby reducing the total weight of the nacelle. Accordingly, the nacelle, including the rear frame structure, can be designed to handle loads which are expected during normal operation of the wind turbine. When it is desired to perform actions which are expected to result in loads exceeding what can be expected during normal operation of the wind turbine, the reinforcement tool can be attached to the rear frame structure at a relevant position. Thereby it is ensured that the rear frame structure is capable of handling extreme and unusual loads which may occur, without having to design the rear frame structure as such in an 'overdimensioned' manner. Accordingly, the manufacturing costs and the weight of the nacelle are minimised. As described above, extreme loads which requires the use of the reinforcement tool of the invention could, e.g., include operating a crane inside the nacelle. The load transferring capability of the reinforcement part provides the required reinforcement to the selected portion of the rear frame structure. Preferably, the reinforcement part has a load-carrying capability which is equal to or higher than a load-carrying capability of the joint which the reinforcement part bridges or of the truss member which the reinforcement part is arranged in parallel to.

In some embodiments, the reinforcement part may have a material thickness which is equal to or higher than a material thickness of the truss member which the reinforcement part is arranged in parallel to. Further, the reinforcement part may be made from steel.

The reinforcement tool may be arranged to be attached to a first truss member and a second truss member in such a manner that the reinforcement part bridges a joint which interconnects the first truss member and the second truss member, the reinforcement tool thereby being arranged to provide a load transferring connection between the first truss member and the second truss member, bypassing the joint.

According to this embodiment, the reinforcement tool is arranged to interconnect two neighbouring truss members of the rear frame structure, in such a manner that the reinforcement part provides a load transferring connection between these two truss members. The load transferring connection bypasses the joint which interconnects the two truss members. Thereby the reinforcement tool allows loads applied to one of the truss members to be at least partly transferred to the other truss member, without involving the joint interconnecting the two truss members. Accordingly, loads applied to one of the truss members can efficiently be distributed among a number of truss members of the rear frame structure, using the reinforcement tool of the invention. This allows extreme loads to be applied to a part of the rear frame structure which is not capable of handling such loads on its own. For instance, it is possible to apply loads to the truss members instead of to the joints.

The reinforcement part may, in this case, be or comprise at least one plate element. The plate element(s) provide(s) a relatively rigid connection between the two truss members. The plate element(s) may, e.g., be attached to the truss members by means of bolts, screws or the like.

The joint may be a pivot joint, and the reinforcement tool may further be arranged to fixate the pivot joint. In the present context the term 'pivot joint' should be interpreted to mean a member which is capable of performing pivotal movements. For instance, the pivot joints may comprise at least two parts being capable of performing pivotal movements with respect to each other. The pivot joints of the rear frame structure may, e.g., be moment neutral, and therefore bending moments are not introduced in the truss members. Accordingly, only compression and tensile forces need to be handled by the truss members of the rear frame structure. However, when extreme loads are expected, the flexibility provided by a pivot joint may be undesirable, and in this case it may be an advantage to fixate the pivot joint by means of the reinforcement tool, thereby providing improved transfer of loads between the truss members.

According to another embodiment, the reinforcement tool may be arranged to be attached to a first joint and a second joint in such a manner that the reinforcement part is arranged in parallel to a truss member having a first end connected to the first joint and a second end connected to the second joint, the reinforcement tool thereby being arranged to provide a load transferring connection between the first joint and the second joint, bypassing the truss member.

According to this embodiment, the reinforcement tool is arranged to interconnect two neighbouring joints of the rear frame structure, in such a manner that the reinforcement part provides a load transferring connection between these two joints. The reinforcement part is arranged in parallel to and bypasses a truss member interconnecting the two joints. Thus, in the case that it is desired to apply a load to a region of the rear frame structure corresponding to the position of the truss member, the load can instead be applied to the reinforcement member, arranged in parallel to the truss member. The load transferring connection provided by the reinforcement part will thereby ensure that the applied load is transferred to the two joint having the reinforcement part attached thereto. Thus, this embodiment of the invention also allows extreme loads to be applied to a part of the rear frame structure which is not capable of handling such loads on its own.

The reinforcement part may, in this case, be or comprise at least one beam element. According to this embodiment one end of the beam element may be attached to one joint and an opposite end of the beam element may be attached to the other joint, e.g. by means of bolts, screws or the like.

The load transferring connection provided by the reinforcement tool may further be arranged to transfer torque between two parts of the rear frame structure.

BRIEF DESCRIPTION OF THE DRAWINGS

The invention will now be described in further detail with reference to the accompanying drawings in which.

DETAILED DESCRIPTION OF THE DRAWINGS

Figure 1:
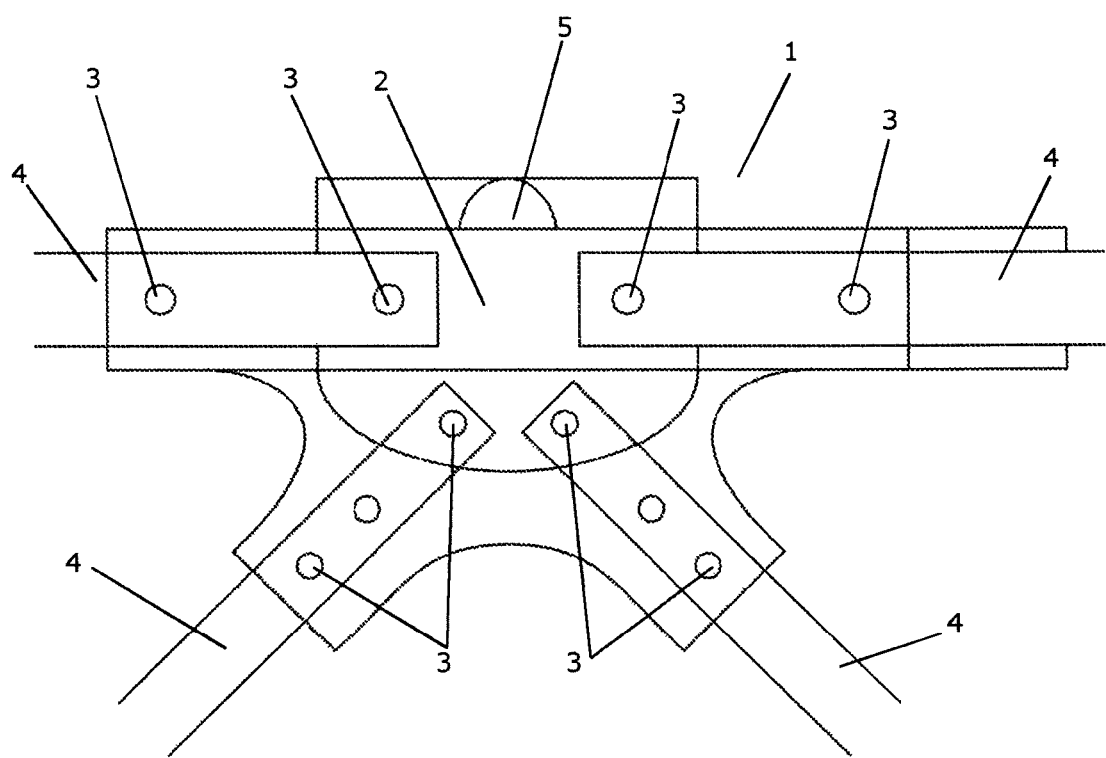
FIG. 1 illustrates a reinforcement tool according to a first embodiment of the invention.

FIG. 1 illustrates a reinforcement tool 1 according to a first embodiment of the invention. The reinforcement tool comprises a reinforcement part 2 in the form of a plate like element, and attaching means 3 in the form of bolts or splits. The attaching means 3 attach the reinforcement part 2 to four different truss members 4 of a rear frame structure for a nacelle of a wind turbine. The reinforcement part 2 bridges a joint 5 which interconnects the four truss members 4.

Since the reinforcement part 2 is in the form of a plate like element, it is relatively stiff. Thereby the reinforcement part 2 provides a load transferring connection between the truss members 4. The load transferring connection bypasses the joint 5, i.e. the joint 5 itself does not form a part of the load path from one truss member 4 to another. Thus, in the case that a load is applied to one of the truss members 4, this load can be distributed among all of the four truss members 4 having the reinforcement part 2 attached thereto, without loading the joint 5. Accordingly, mounting the reinforcement tool 1 on the rear frame structure as shown in FIG. 1 allows extreme loads to be temporarily applied to one of the truss members 4. Such extreme loads may, e.g., be in the form of a crane mounted on one of the truss members 4.

In the case that the joint 5 is a pivot joint, the reinforcement tool 1 further fixates the joint 5 in the sense that the reinforcement tool 1 prevents the joint 5 from performing pivotal movements when it is mounted on the rear frame structure as illustrated in FIG. 1. In the case that the pivotal movements of the joint 5 result in an adjustment of the angles between the respective truss members 4 connected to the joint 5, such angle adjustments are prevented when the reinforcement tool 1 is mounted on the rear frame structure, i.e. the truss members 4 are then fixed relative to each other.

Furthermore, since the attaching means 3 are in the form of bolts or splits, the reinforcement tool 1 can easily be mounted on and detached from the rear frame structure. Accordingly, the reinforcement tool 1 can be mounted on the rear frame structure when extreme loads are expected, and detached when extreme loads are no longer expected. Accordingly, the rear frame structure is capable of handling extreme loads without having to design the rear frame structure to handle such extreme loads permanently, and thereby the manufacturing costs and the weight of the rear frame structure are maintained at a low level.

Figure 2:
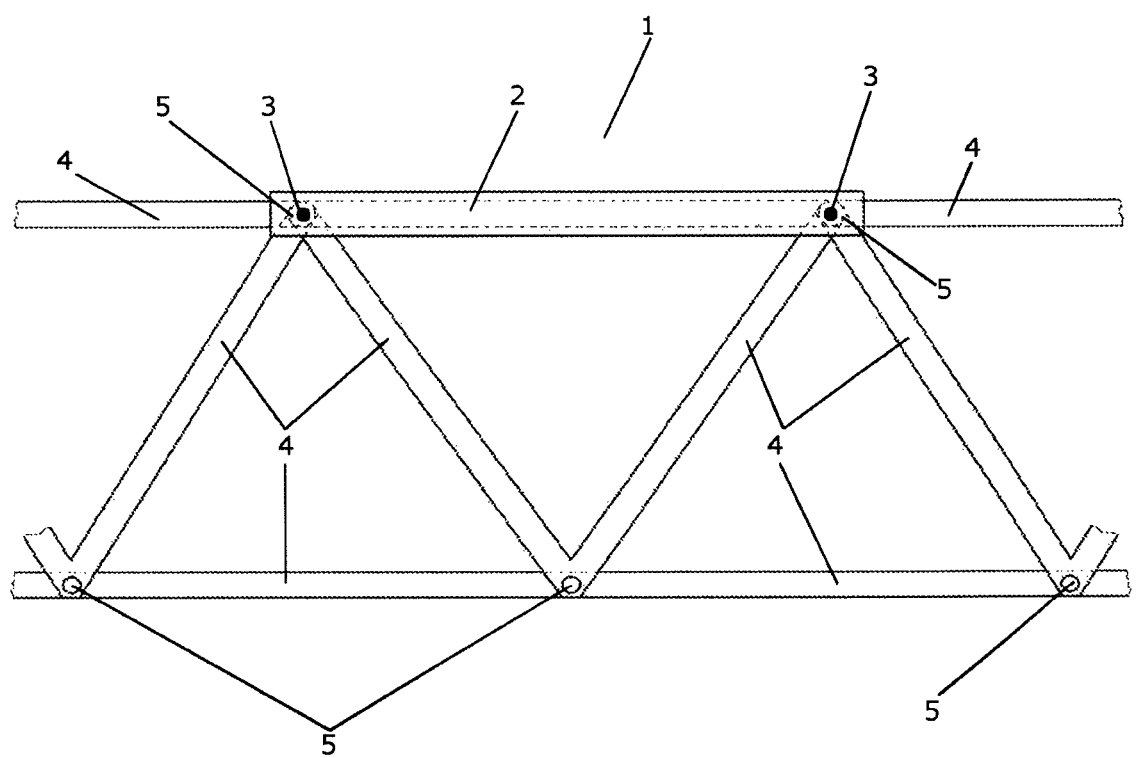
FIG. 2 illustrates a reinforcement tool according to a second embodiment of the invention.

FIG. 2 illustrates a reinforcement tool 1 according to a second embodiment of the invention. The reinforcement tool 1 comprises a reinforcement part 2 in the form of a beam and attaching means 3 in the form of bolts or splits. The attaching means 3 attach the reinforcement part 2 to two different joints 5 of a rear frame structure for a nacelle of a wind turbine. The reinforcement part 2 is arranged in parallel to a truss member 4 of the rear frame structure having its ends connected to the two joints 5 having the reinforcement part 2 attached thereto. Thereby the reinforcement part 2 provides a load transferring connection between the joints 5, and the load transferring connection bypasses the truss member 4, i.e. the truss member 4 does not form part of the load path between the joints 5.

The reinforcement tool 1 allows extreme loads to be applied to the rear frame structure at a position corresponding to the position of the truss member 4 being connected to the joints 5 having the reinforcement part 2 attached thereto, without excessively loading the truss member 4. In order to obtain this, the extreme loads are instead applied to the reinforcement part 2, and the load is then transferred, by means of the reinforcement tool 1, to the joints 5, without applying loads to the truss member 4. The extreme loads could, e.g., be in the form of a crane mounted on the reinforcement part 2.

Similarly to the embodiment described above with reference to FIG. 1, the reinforcement tool 1 of FIG. 2 can easily be mounted on and detached from the rear frame structure, according to whether or not extreme loads are expected. Accordingly, the rear frame structure is capable of handling extreme loads without having to design the rear frame structure to handle such extreme loads permanently, and thereby the manufacturing costs and the weight of the rear frame structure are maintained at a low level.

Figure 3:
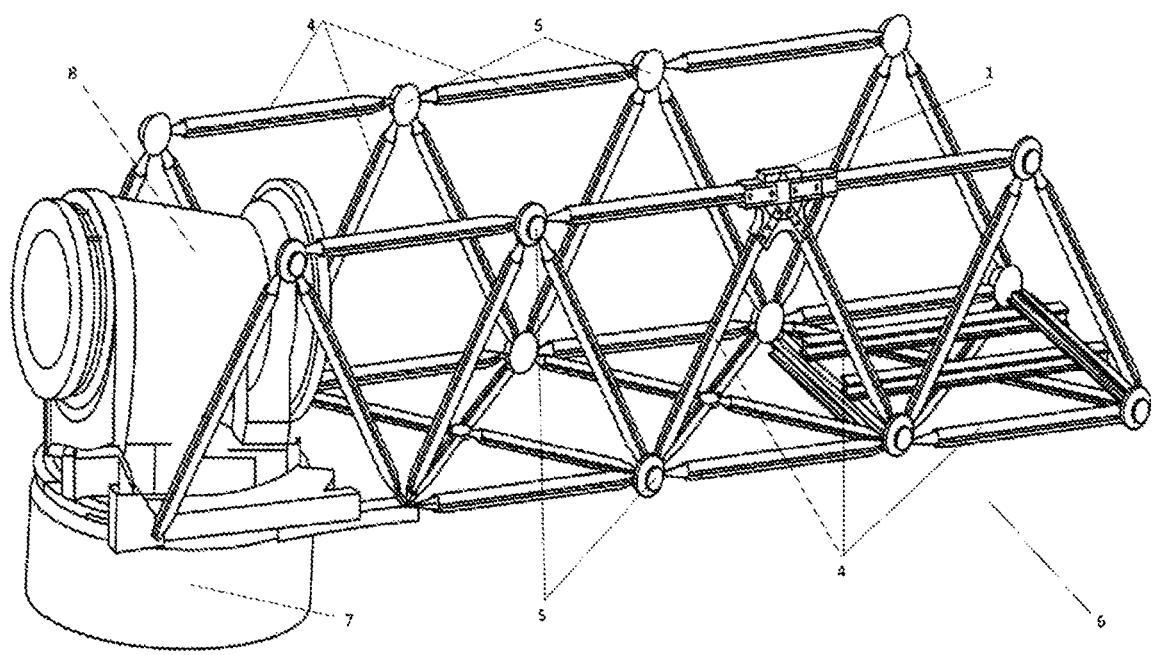
FIG. 3 is a perspective view of a rear frame structure for a wind turbine nacelle having the reinforcement tool of FIG. 1 mounted thereon.

FIG. 3 is a perspective view of a rear frame structure 6 for a wind turbine nacelle having the reinforcement tool 1 of FIG. 1 mounted thereon. The rear frame structure 6 comprises a plurality of truss members 4 and a plurality of joints 5 interconnected to form a truss structure with the joints 5 arranged in the node points of the truss structure. The rear frame structure 6 is attached to a main frame 7 of the nacelle, the main frame 7 carrying a main bearing 8. The reinforcement tool 1 is mounted across one of the joints 5 in such a manner that it provides a load transferring connection between the truss members 4 attached to the joint 5, in the manner described above with reference to FIG. 1.

Figure 4:
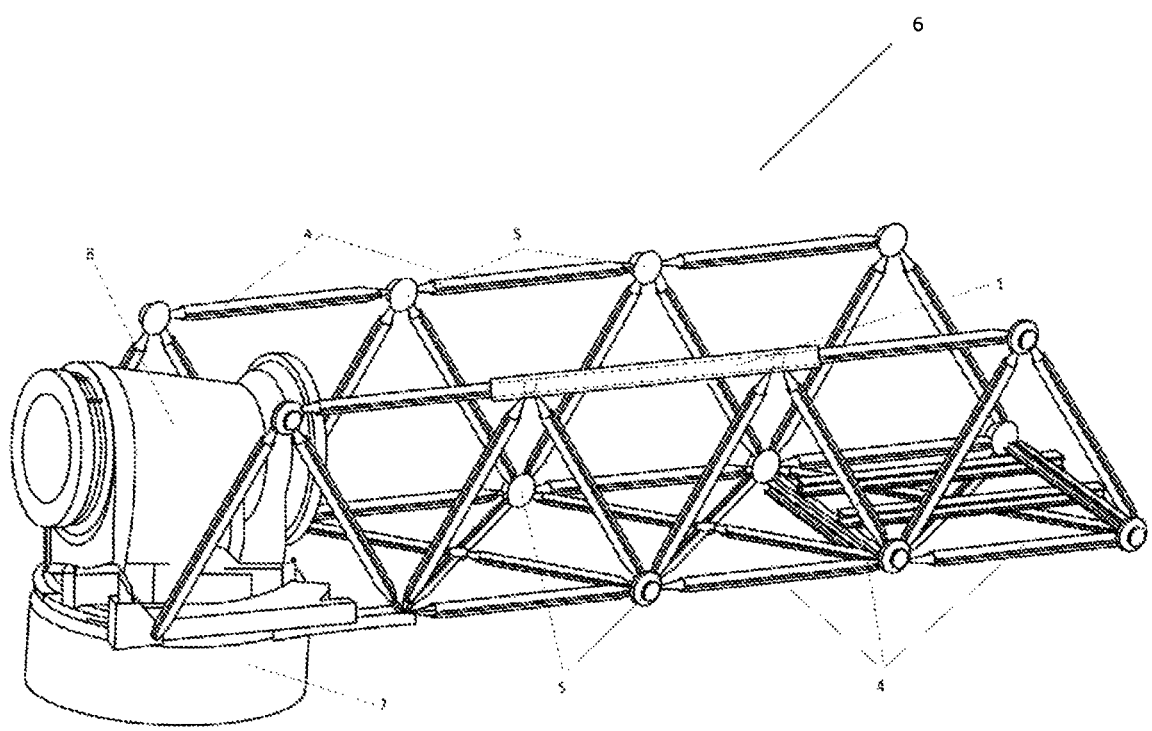
FIG. 4 is a perspective view of a rear frame structure for a wind turbine nacelle having the reinforcement tool of FIG. 2 mounted thereon.

FIG. 4 is a perspective view of a rear frame structure 6 for a wind turbine nacelle having the reinforcement tool 1 of FIG. 2 mounted thereon. The rear frame structure 6 comprises a plurality of truss members 4 and a plurality of joints 5 interconnected to form a truss structure with the joints 5 arranged in the node points of the truss structure. The rear frame structure 6 is attached to a main frame 7 of the nacelle, the main frame 7 carrying a main bearing 8. The reinforcement tool 1 is mounted in parallel to one of the truss members 4 in such a manner that it provides a load transferring connection between the two joints 5 having the truss member 4 attached thereto, in the manner described above with reference to FIG. 2.

In further embodiments, the invention relates to a nacelle of a wind turbine, the nacelle comprising a rear frame structure (6), the rear frame structure (6) comprising a plurality of truss members (4), and a plurality of pivot joints (5), wherein each pivot joint (5) interconnects ends of at least two truss members (4), thereby forming a truss structure with the pivot joints (5) arranged in node points of the truss structure, and wherein at least some of the pivot joints (5) are adjustable in such a manner that an angle between two truss members (4) being interconnected via a pivot joint (5) is adjustable by means of the pivot joint (5), wherein the rear frame structure (6) has at least one detachable reinforcement tool (1) mounted thereon for providing temporary reinforcement of said rear frame structure (6).

In an embodiment, the rear frame structure (6) defines at least a bottom part and two side parts.

In an embodiment, the rear frame structure (6) further defines a top part.

In an embodiment, all of the truss members (4) are of substantially identical length.

In an embodiment, at least one of the pivot joints (5) comprises a base part and at least two connecting parts, each connecting part being attached to the base part via a hinge structure, and each connecting part being arranged to be connected to or form part of a truss member (4).

In an embodiment, at least one of the pivot joints (5) is/are provided with a locking mechanism allowing substantially free pivotal movements of the pivot joints (5) when the locking mechanism is in an unlocked position, and wherein such free pivotal movement is prevented or restricted when the locking mechanism is in a locked position.

In an embodiment, the truss structure defines one or more triangles, the sides of the triangle(s) being formed by truss members (4), and the vertices of the triangle(s) being formed by pivot joints (5).

The invention claimed is:

1. A nacelle for a wind turbine, the nacelle comprising:
   a rear frame structure comprising:
      a plurality of parts, including a plurality of truss members and a plurality of joints, each joint interconnecting ends of at least two truss members,
      wherein the rear frame structure has at least one detachable reinforcement tool, the at least one reinforcement tool comprising:
         a reinforcement part; and attaching means for detachably attaching the reinforcement part to at least first and second parts of the plurality of parts of the rear frame structure, wherein the reinforcement tool provides a load transferring connection between the at least first and second parts of the rear frame structure, at least partly bypassing a third part of the plurality of parts that interconnects the at least first and second parts, wherein the reinforcement part is attached to the at least first and second parts of the rear frame structure by means of the attaching means.

2. The nacelle according to claim 1, wherein the load transferring connection provided by the reinforcement tool further transfers torque between the at least first and second parts of the plurality of parts of the rear frame structure.

3. The nacelle according to claim 1, wherein the attaching means is or comprises one or more bolts.

4. The nacelle according to claim 1, wherein the reinforcement part is made from steel.

5. The nacelle according to claim 1, wherein the first part includes a first joint of the plurality of joints, the second part includes a second joint of the plurality of joints, and the third part includes a truss member of the plurality of truss members having a first end connected to the first joint and a second end connected to the second joint, such that the reinforcement part is parallel to the truss member of the plurality of truss members, the reinforcement tool thereby being a load transferring connection between the first joint and the second joint, at least partly bypassing the truss member.

6. The nacelle according to claim 5, wherein the reinforcement part has a load-carrying capability which is equal to or higher than a load-carrying capability of the truss member which the reinforcement part is arranged in parallel to.

7. The nacelle according to claim 5, wherein the reinforcement part has a material thickness which is equal to or higher than a material thickness of the truss member which the reinforcement part is arranged in parallel to.

8. The nacelle according to claim 1, wherein the first part includes a first truss member of the plurality of truss members, the second part includes a second truss member of the plurality of truss members, and the third part includes a joint of the plurality of joints which interconnects the first truss member and the second truss member, such that the reinforcement part bridges the joint of the plurality of joints, the reinforcement tool thereby being a load transferring connection between the first truss member and the second truss member, at least partly bypassing the joint.

9. The nacelle according to claim 8, wherein the reinforcement part is or comprises at least one plate element.

10. The nacelle according to claim 8, wherein the reinforcement part has a load-carrying capability which is equal to or higher than a load-carrying capability of the joint which the reinforcement part bridges.

11. A nacelle for a wind turbine, the nacelle comprising:
a rear frame structure, comprising:
a plurality of parts, including a plurality of truss members and a plurality of joints, each joint interconnecting ends of at least two truss members,
wherein the rear frame structure has at least one detachable reinforcement tool, the at least one reinforcement tool comprising:
a reinforcement part; and
attaching means for detachably attaching the reinforcement part to at least first and second parts of the plurality of parts of the rear frame structure,
wherein the reinforcement tool is arranged to provide a load transferring connection between the at least first and second parts of the rear frame structure when the reinforcement part is attached to the at least first and second parts of the rear frame structure by means of the attaching means,
wherein the first part includes a first truss member of the plurality of truss members, and the second part includes a second truss member of the plurality of truss members, and the third part includes a joint of the plurality of joints which interconnects the first truss member and the second truss member, such that the reinforcement part bridges the joint of the plurality of joints, the reinforcement tool thereby being a load transferring connection between the first truss member and the second truss member, bypassing the joint,
wherein the joint is a pivot joint, and wherein the reinforcement tool further fixates the pivot joint.

12. A nacelle for a wind turbine, the nacelle comprising:
a rear frame structure, comprising:
a plurality of parts, including a plurality of truss members and a plurality of joints, each joint interconnecting ends of at least two truss members,
wherein the rear frame structure has at least one detachable reinforcement tool, the at least one reinforcement tool comprising:
a reinforcement part; and
attaching means for detachably attaching the reinforcement part to at least first and second parts of the plurality of parts of the rear frame structure,
wherein the reinforcement tool is arranged to provide a load transferring connection between the at least first and second parts of the rear frame structure when the reinforcement part is attached to the at least first and second parts of the rear frame structure by means of the attaching means,
wherein the first part includes a first joint of the plurality of joints, the second part includes a second joint of the plurality of joints, and the third part includes a truss member of the plurality of truss members having a first end connected to the first joint and a second end connected to the second joint, such that the reinforcement part is parallel to the truss member of the plurality of truss members, the reinforcement tool thereby being a load transferring connection between the first joint and the second joint, bypassing the truss member,
wherein the reinforcement part is or comprises at least one beam element.

13. A wind turbine comprising the nacelle according to claim 1.

* * * * *